(12) United States Patent
Sasanouchi (10) Patent No.: US 7,483,771 B2
(45) Date of Patent: Jan. 27, 2009

(54) VEHICLE INPUT SYSTEM

(75) Inventor: Kiyotaka Sasanouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 11/436,637

(22) Filed: May 19, 2006

(65) Prior Publication Data

US 2006/0261976 A1    Nov. 23, 2006

(30) Foreign Application Priority Data

May 19, 2005    (JP)    ............... 2005-146242

(51) Int. Cl.
*G05D 1/00*    (2006.01)
(52) U.S. Cl. ............... 701/1; 701/33; 701/36; 340/905
(58) Field of Classification Search ............... 701/1, 701/33, 35, 36; 340/905
See application file for complete search history.

(56) References Cited

U.S. PATENT DOCUMENTS 5,309,442 A * 5/1994 Saeki ............ 370/354
5,974,136 A * 10/1999 Murai ............ 379/269
6,959,177 B1 * 10/2005 Oouchi ............ 455/254

FOREIGN PATENT DOCUMENTS

JP    2003-68162    3/2003

* cited by examiner

*Primary Examiner*—Gertrude Arthur Jeanglaud
(74) *Attorney, Agent, or Firm*—Wenderoth, Lind & Ponack, L.L.P.

(57) ABSTRACT

A vehicle input system is provided which includes: an input unit which accepts an operation instruction for a plurality of pieces of equipment on board an automobile; a control section which, in accordance with an operation instruction accepted by the input unit, transmits a control signal for controlling equipment targeted by the operation instruction; and an information acquisition section which, if at least one of the plurality of pieces of equipment is exchanged and if new equipment is added, then acquires, as control-signal information, information on a control signal for controlling the substituted or added equipment, in which the control section generates the control signal in accordance with the control-signal information acquired by the information acquisition section.

16 Claims, 12 Drawing Sheets

VEHICLE INPUT SYSTEM

BACKGROUND OF THE INVENTION

1. Field of the Invention

The present invention relates to a vehicle input system which is provided in the cabin of an automobile.

2. Description of the Background Art

In recent years, an automobile has more and more equipment on board so that safety and comfort can be improved. Specifically, an air conditioner or an audio system is provided as standard equipment, and a car-navigation system has been popular. In the years ahead, equipment related to car communication mainly including telematics is expected to be increasingly popular. As a single input unit which is capable of operating many kinds of such equipment in common, there is known, for example, the one described in Japanese Patent Laid-Open No. 2003-68162 specification. In this specification, a switch system is proposed which is shown in FIG. 12.

Figure 12:
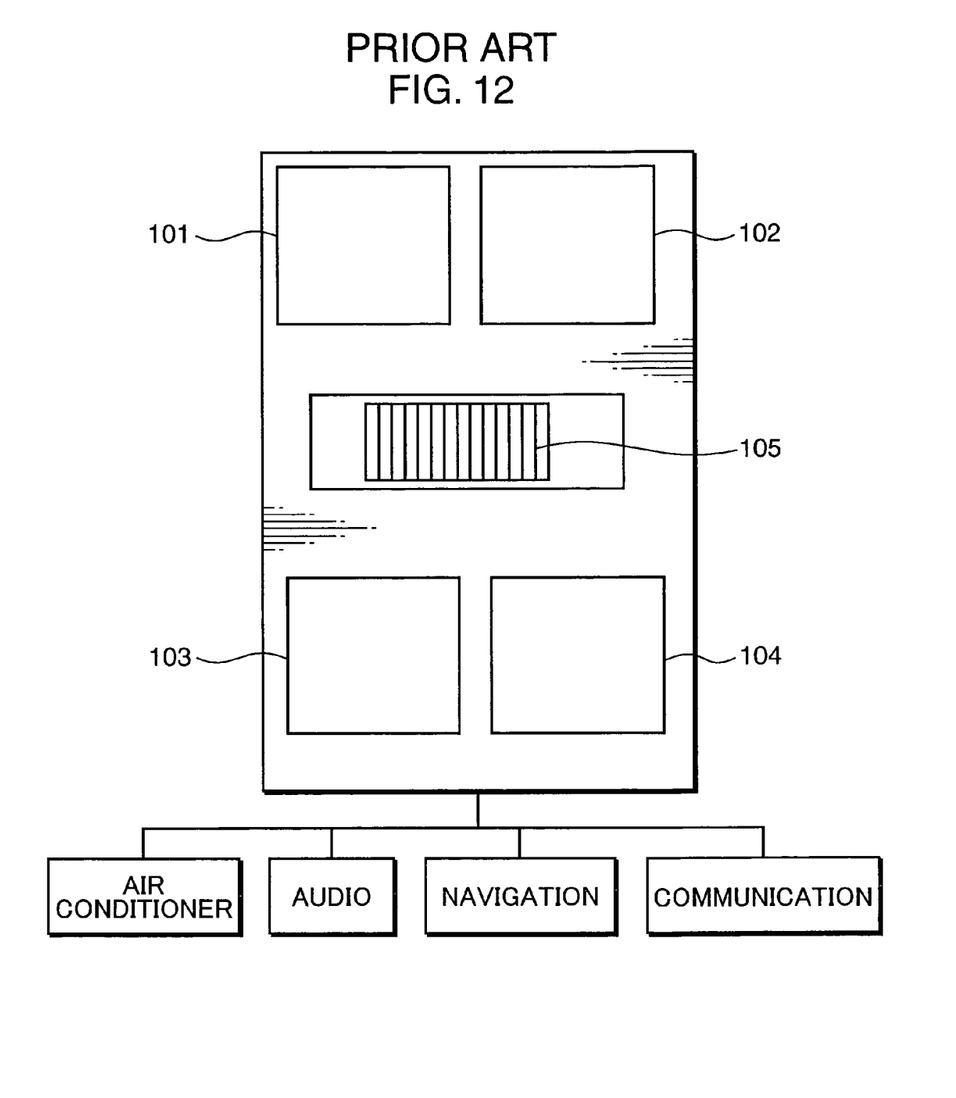
FIG. 12 is a block diagram, showing the configuration of a system according to a prior art.

In FIG. 12, reference numerals 101 to 104 denote push selection switches, and a reference numeral 105 designates a dial operation unit. The dial operation unit 105 is formed by a disk-shaped member which turns around a shaft located in the up-and-down directions of FIG. 12. In the peripheral part of this disk-shaped member, grooves are formed for preventing slipping. The dial operation unit 105 shown in FIG. 12 corresponds to its disk-shaped member's periphery, if seen from the directions perpendicular to the rotation shaft.

For example, if the dial operation unit 105 is turned, the equipment to be operated is switched. Thereby, the push selection switches 101 to 104 each change into a switch for selecting equipment, such as an air conditioner, an audio system, a car-navigation system and a communication device. Or, they change into a switch for selecting a function of audio equipment, such as an FM radio, an AM radio, a CD (or compact disk) player and a tape recorder. Then, such a selection switch is displayed in a display unit, so that an operator can operate it while checking the contents of an operation.

However, in an input unit connected to various such in-vehicle equipment operation units as described above, let's assume that the connected equipment to be operated has been replaced. In this case, if the equipment provided by the replacement has the same function as the original equipment as well as if it is controlled using the same control signal, it can be operated without any trouble by the above described input unit. On the other hand, if the equipment provided by the replacement has a different function, or if it is controlled using a different control signal, the input unit cannot output a control signal which corresponds to the substituted equipment. This makes it difficult to operate such fresh substituted equipment using this input unit. In addition, if new equipment is added, then alike, the input unit cannot output a control signal which corresponds to the freshly-added equipment. Thus, it is hard to operate such newly-added equipment using this input unit.

Therefore, in such an input unit as described above, a disadvantage arises in that newly-added or substituted equipment cannot be operated.

SUMMARY OF THE INVENTION

It is an object of the present invention to provide a vehicle input system which is capable of operating any equipment using one and the same input unit, even if equipment to be operated is substituted or added.

A vehicle input system according to an aspect of the present invention, comprising: an input unit which accepts an operation instruction for a plurality of pieces of equipment on board an automobile; and a control section which, in accordance with an operation instruction accepted by the input unit, transmits a control signal for controlling the equipment targeted by the operation instruction, wherein if at least one of the plurality of pieces of equipment is exchanged or removed, or if new equipment is added, the control section changes the control signal in accordance with the exchange, removal and addition of the equipment.

According to the present invention, if at least one of a plurality of pieces of equipment on board an automobile is exchanged or removed, or if new equipment is added, then the composition of a control signal is changed which is transmitted to equipment from the control section. Thereby, the control signal can be changed so that it will be adapted to a change in the situation caused by the exchange, removal or addition of the equipment. This makes it possible to operate equipment without changing the input unit and the control section, even if equipment is replaced, removed or added.

These and other objects, features and advantages of the present invention will become more apparent upon reading of the following detailed description along with the accompanied drawings.

DESCRIPTION OF THE PREFERRED EMBODIMENTS

Figure 1:
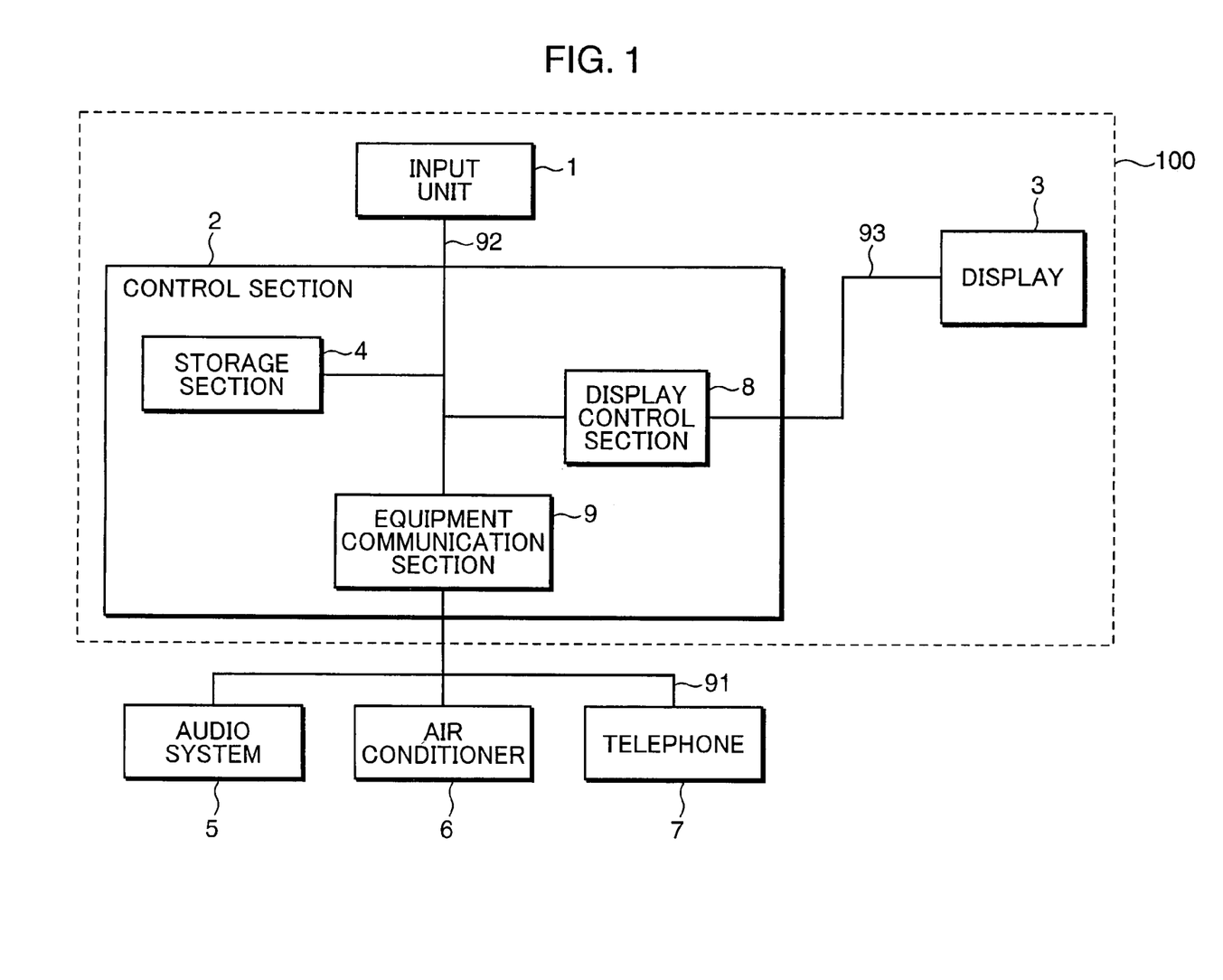
FIG. 1 is a block diagram, showing the configuration of an input unit, a control section, a plurality of pieces of equipment and a display according to an embodiment of the present invention.
Figure 2:
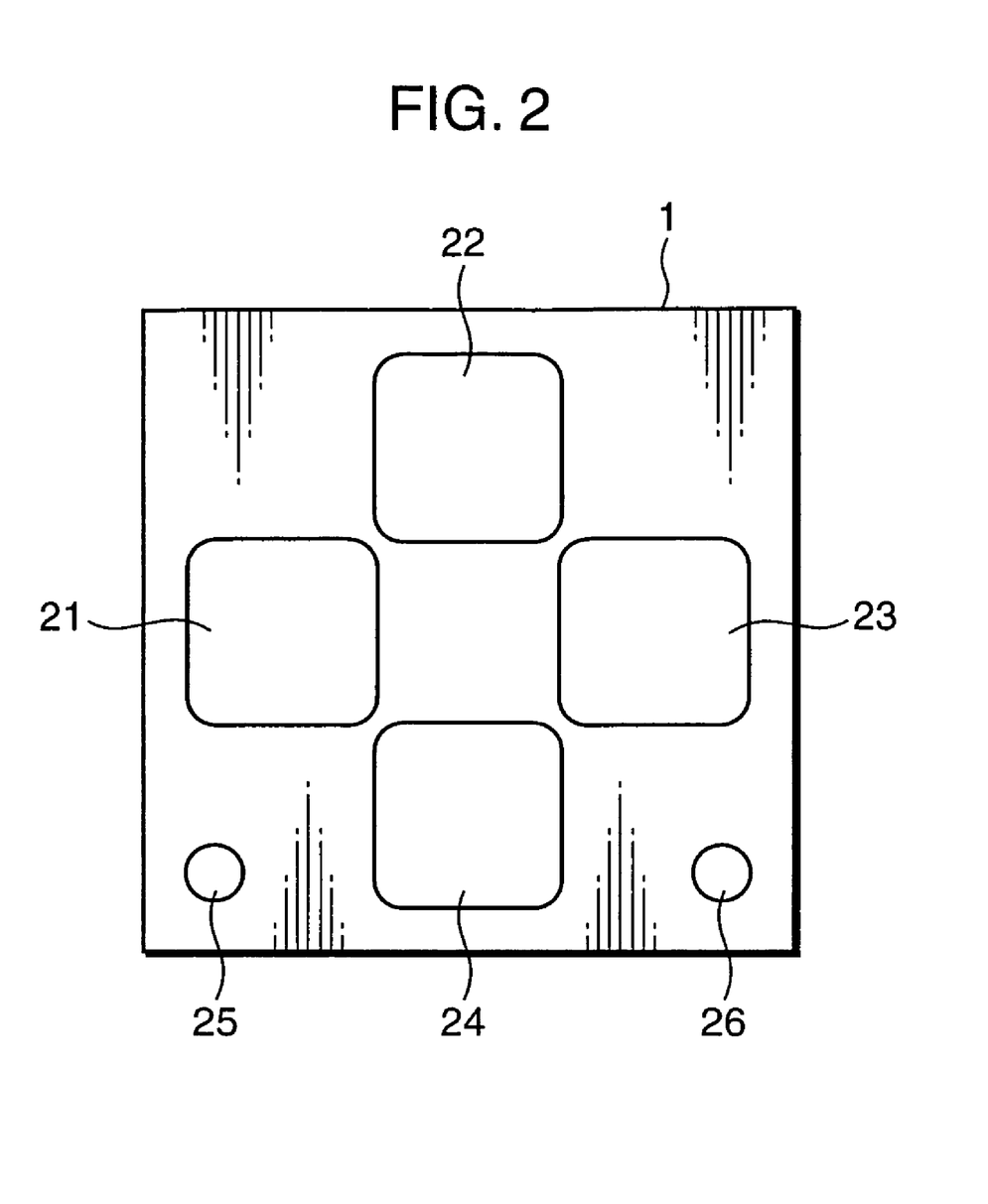
FIG. 2 is a plan view of an input unit according to an embodiment of the present invention.
Figure 3:
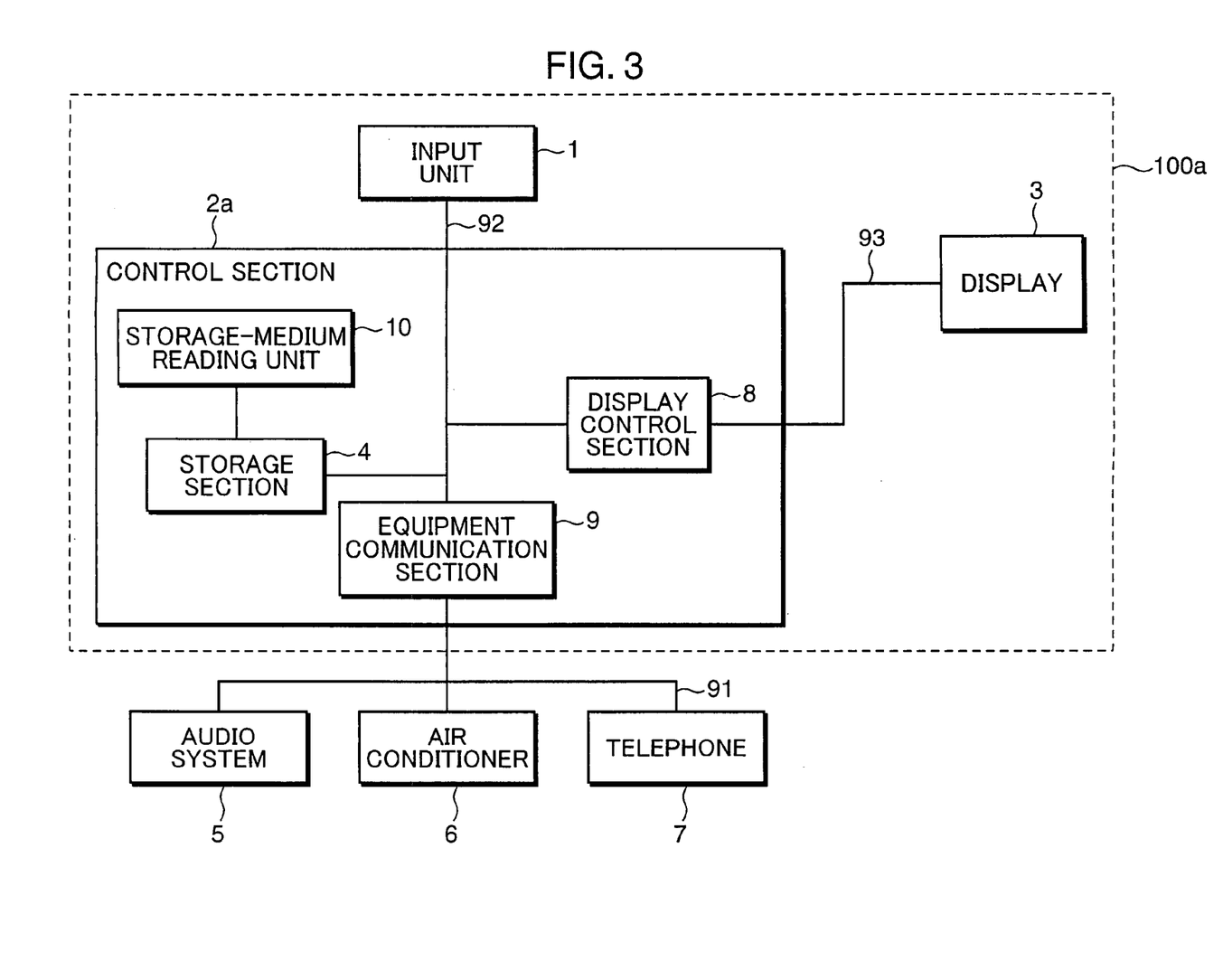
FIG. 3 is a block diagram, showing the configuration of an input unit, a control section with a storage medium reading function, a plurality of pieces of equipment and a display according to an embodiment of the present invention.
Figure 5A:
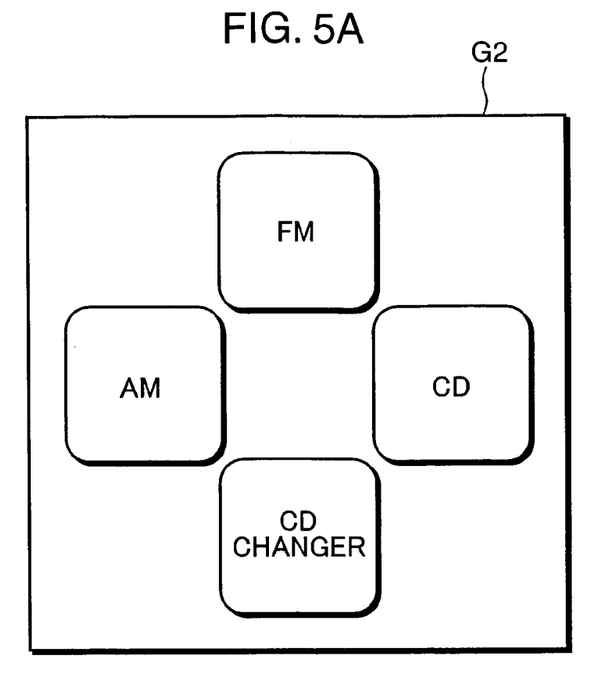
FIGS. 5A and 5B are diagrams, showing an example of the display operation according to an embodiment of the present invention.
Figure 5B:
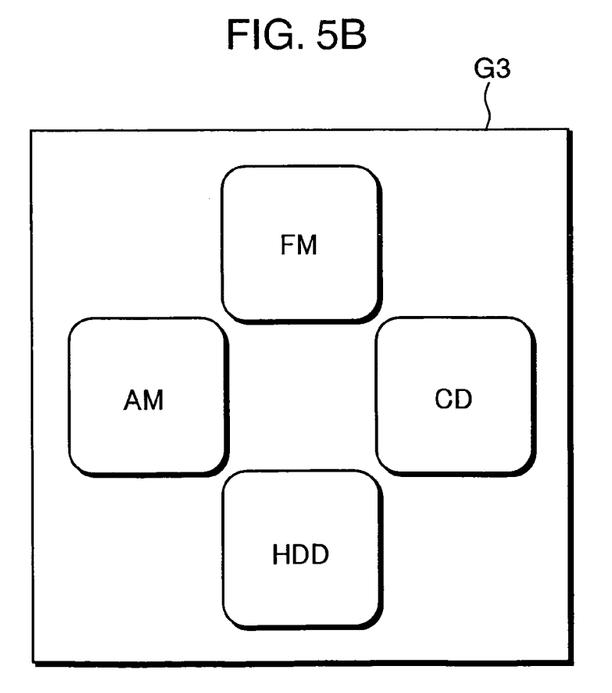
Figure 6:
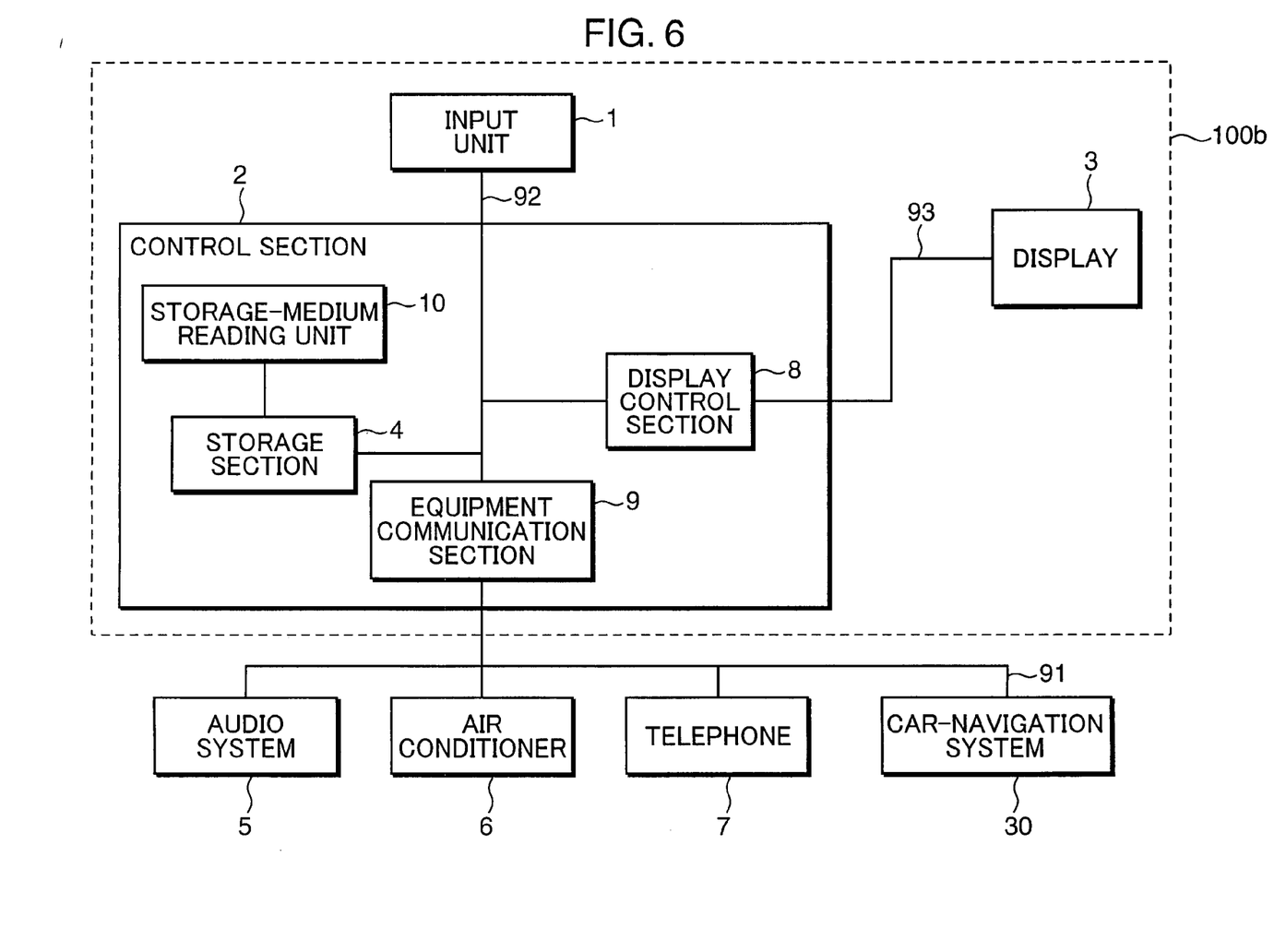
FIG. 6 is a block diagram, showing the configuration of an input unit, a control section with a storage medium reading function when equipment is added, a plurality of pieces of equipment and a display according to an embodiment of the present invention.
Figure 7:
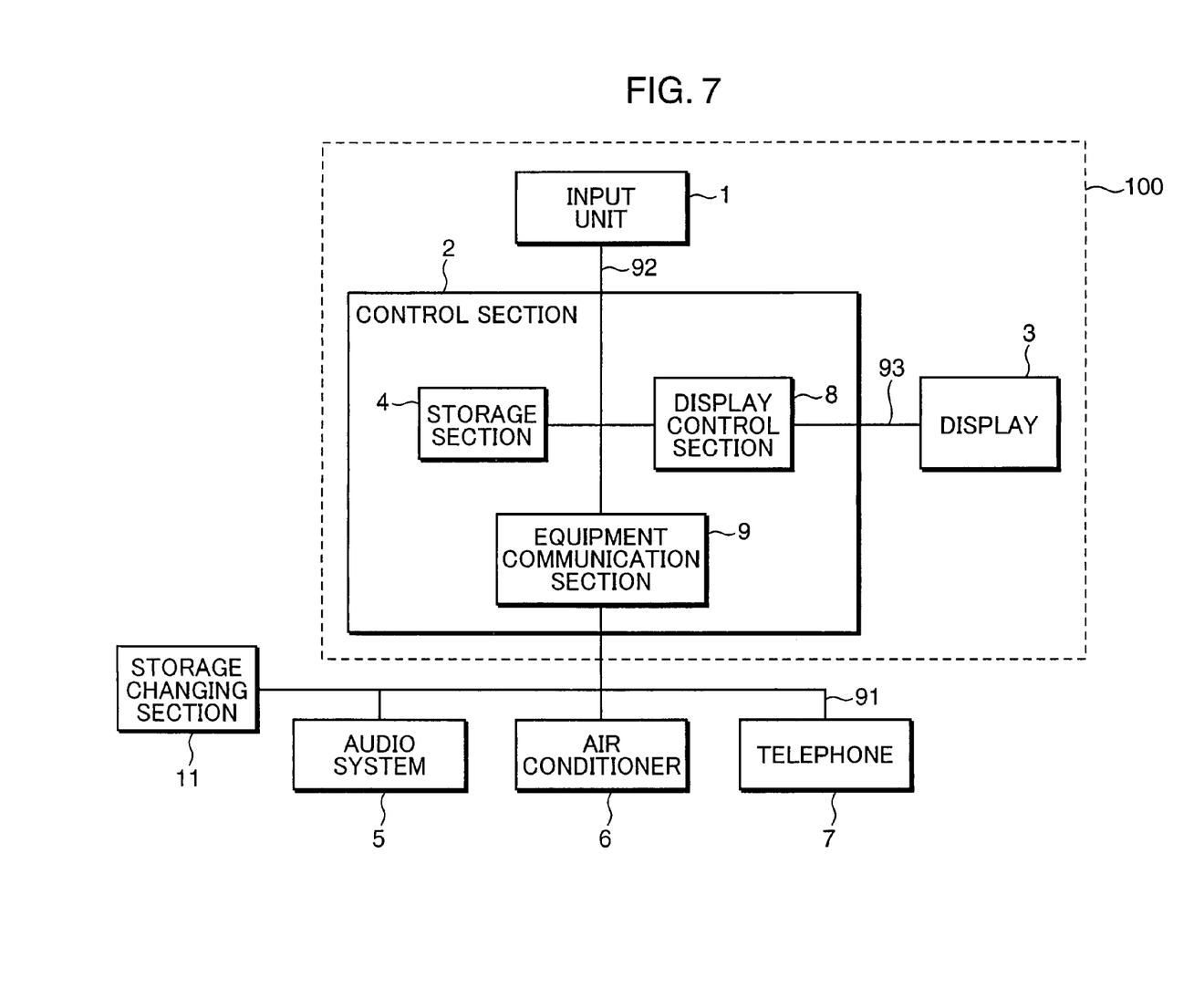
FIG. 7 is a block diagram, showing the configuration of an input unit, a control section with a wire-communication function, a plurality of pieces of equipment and a display according to an embodiment of the present invention.
Figure 8:
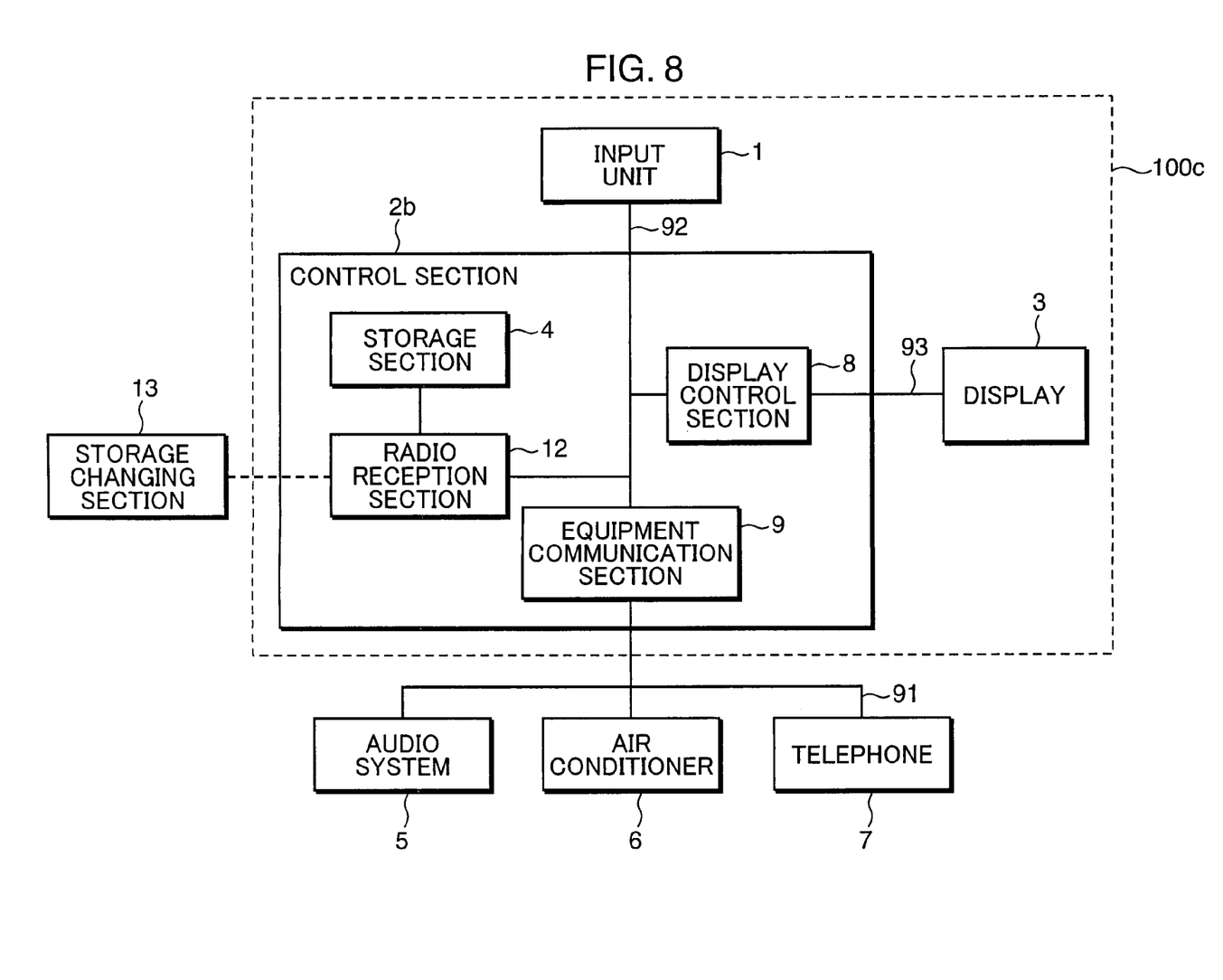
FIG. 8 is a block diagram, showing the configuration of an input unit, a control section with a radio-communication function, a plurality of pieces of equipment and a display according to an embodiment of the present invention.
Figure 9:
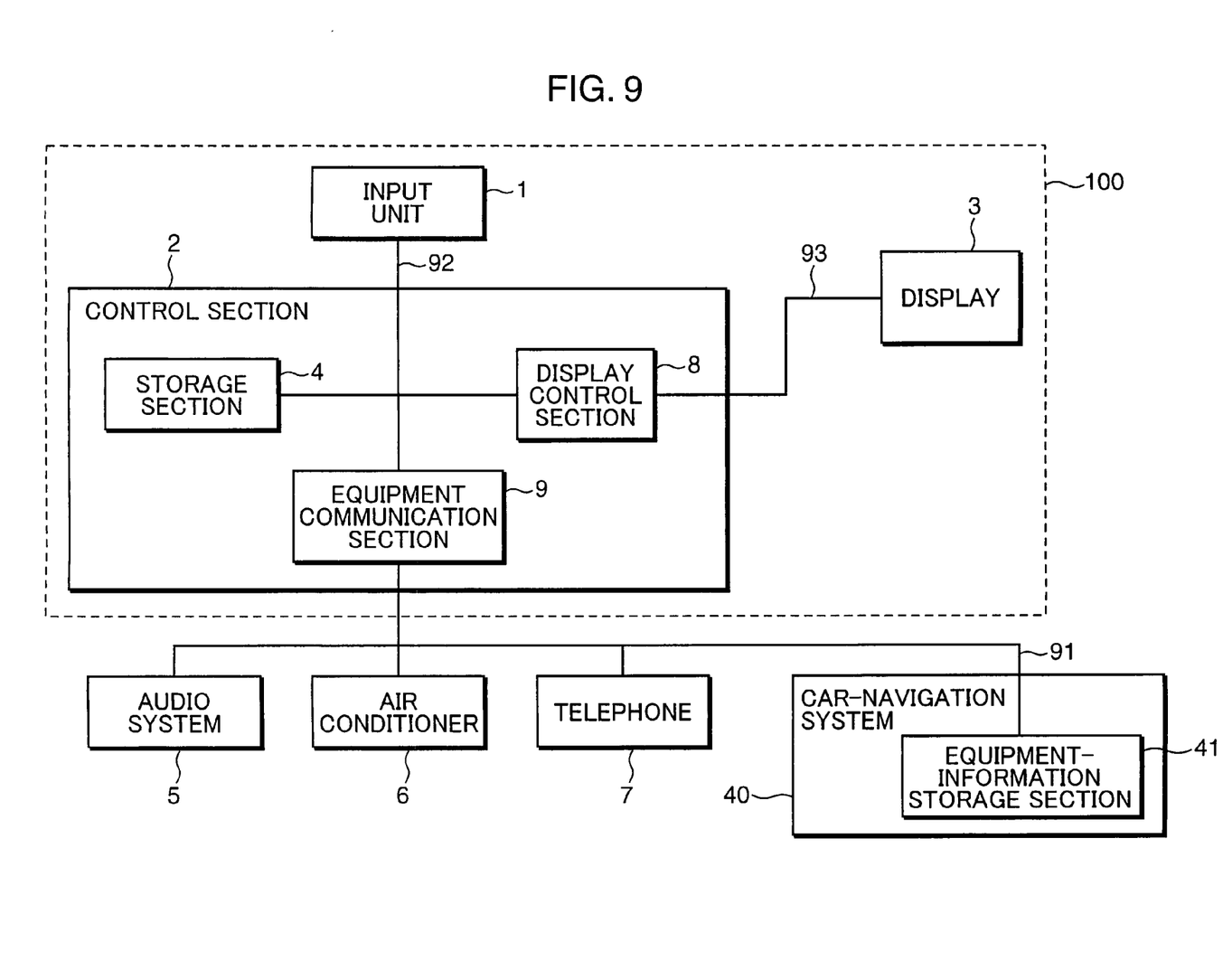
FIG. 9 is a block diagram, showing the configuration of an input unit, a control section, a plurality of pieces of equipment and a display according to an embodiment of the present invention.
Figure 10:
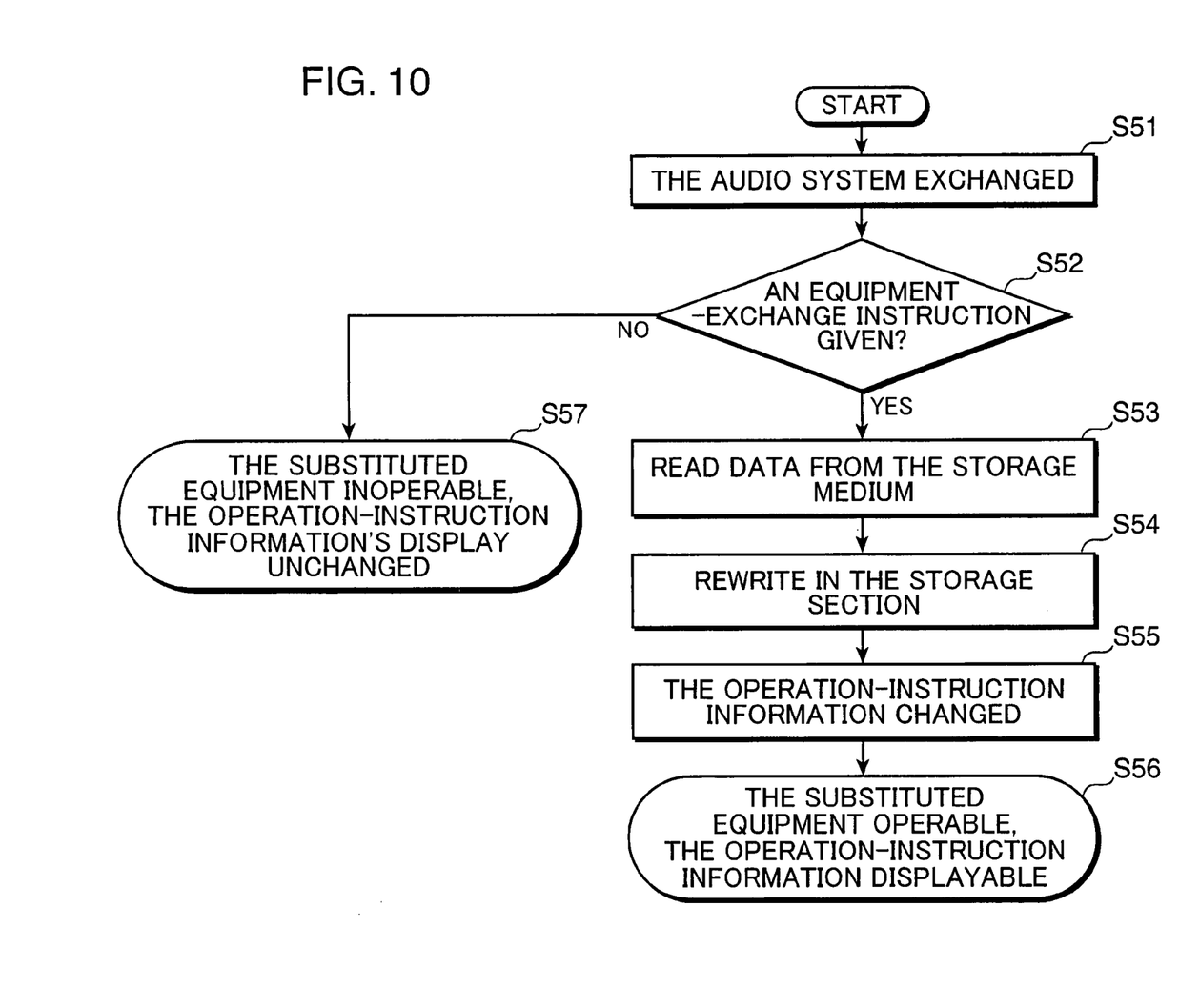
FIG. 10 is a flow chart, schematizing the operation of a system when equipment is exchanged according to an embodiment of the present invention.
Figure 11:
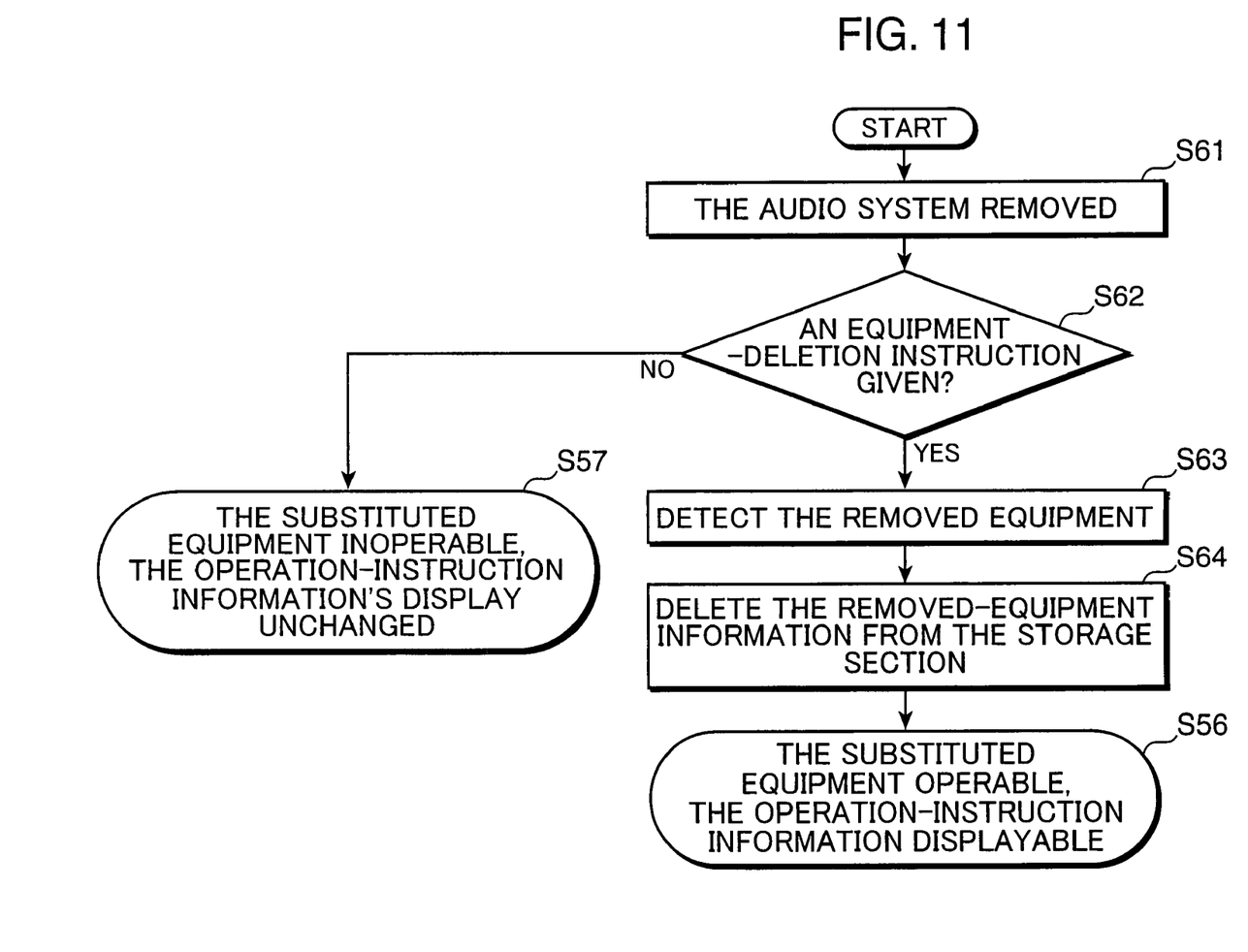
FIG. 11 is a flow chart, schematizing the operation of a system when equipment is removed according to an embodiment of the present invention.

Hereinafter, a vehicle input system according to each embodiment of the present invention will be described. FIG. 1 is a block diagram, showing the configuration of an input unit, a control section, a plurality of pieces of equipment and a display according to an embodiment of the present invention. FIG. 2 is a plan view of an input unit. FIG. 3 is a block diagram, showing the configuration of an input unit, a control section with a storage medium reading function, a plurality of pieces of equipment and a display. FIGS. 4A and 4B and FIGS. 5A and 5B are each a diagram, showing an example of the display operation. FIG. 6 is a block diagram, showing the configuration of an input unit, a control section with a storage medium reading function when equipment is added, a plurality of pieces of equipment and a display. FIG. 7 is a block diagram, showing the configuration of an input unit, a control section with a wire-communication function, a plurality of pieces of equipment and a display. FIG. 8 is a block diagram, showing the configuration of an input unit, a control section with a radio-communication function, a plurality of pieces of equipment and a display. FIG. 9 is a block diagram, showing the configuration of an input unit, a control section, a plurality of pieces of equipment and a display. FIG. 10 is a flow chart, schematizing the operation of a system when equipment is exchanged. FIG. 11 is a flow chart, schematizing the operation of a system when equipment is removed.

FIG. 1 shows an example of the basic configuration of a vehicle input system 100 according to the present invention. A reference numeral 1 denotes an input unit; 2, a control section connected to the input unit 1; 3, a display connected to the control section 2; 4, a storage section inside of the control section 2; 8, a display control section which is inside of the control section 2 and controls the contents of a display in the display 3; and 9, an equipment communication section which is inside of the control section 2 and transmits a control signal for controlling equipment, such as an audio system 5, an air conditioner 6 and a telephone 7, via a communication line 91 to such equipment.

The input unit 1 is provided, for example, in the steering wheel of an automobile. As shown in FIG. 2, it includes, for example, five push switches 21, 22, 23, 24, 25. If each push switch 21, 22, 23, 24, 25 is pressed down by a user, its detection signal is transmitted through a signal line 92 to the control section 2.

The display 3 is a display unit which comprises, for example, a liquid-crystal display, a head-up display, or the like. It is disposed in a position easily seen by a driver, for example, in the automobile's center console or dashboard. The display 3 is connected via a signal line 93 to the display control section 8 and displays an image according to a signal transmitted through the signal line 93 from the display control section 8.

The storage section 4 comprises a writable non-volatile storage unit, for example, an EEPROM (or electrically erasable and programmable read only memory) or a hard-disk unit. It stores control-signal information on a control signal for controlling equipment connected to the communication line 91, for example, the audio system 5, the air conditioner 6, or the telephone 7, and operation-instruction information which indicates one or a plurality of operation instructions acceptable by such equipment. Besides, in the storage section 4, the array of the push switches 21, 22, 23, 24 is stored in advance.

The control section 2 comprises, for example: a CPU (or central processing unit) which executes a predetermined arithmetic processing; a ROM (or read only memory) in which a predetermined control program is stored; a RAM (or random access memory) which stores data temporarily; the storage section 4; their peripheral circuits; and the like. It functions as the display control section 8 and the equipment communication section 9 by executing the control program stored in the ROM.

FIG. 3 shows an embodiment of a vehicle input system 100a which further includes a storage-medium reading unit 10 provided in the control section 2 shown in FIG. 1. A control section 2a shown in FIG. 3 is configured by connecting the storage-medium reading unit 10 to the storage section 4.

The storage-medium reading unit 10 is a reading unit which reads, for example, data which is stored in a memory card such as an SD (or Secure Digital) card and a compact flash, and a storage medium such as an FD (or floppy disk) and a CD (or compact disk), and for example, data such as control-signal information on a control signal for controlling equipment connected to the communication line 91 and operation-instruction information which indicates one or a plurality of operation instructions acceptable by such equipment. In this case, the storage-medium reading unit 10 corresponds to an example of an information acquisition section.

Next, an operation will be described of the vehicle input system 100a configured as described above. First, the audio system 5, the air conditioner 6 and the telephone 7 are connected to the communication line 91. In the storage section 4, there are stored control-signal information on a control signal for controlling the audio system 5, the air conditioner 6 and the telephone 7, and operation-instruction information which indicates one or a plurality of operation instructions acceptable by such equipment.

Figure 4A:
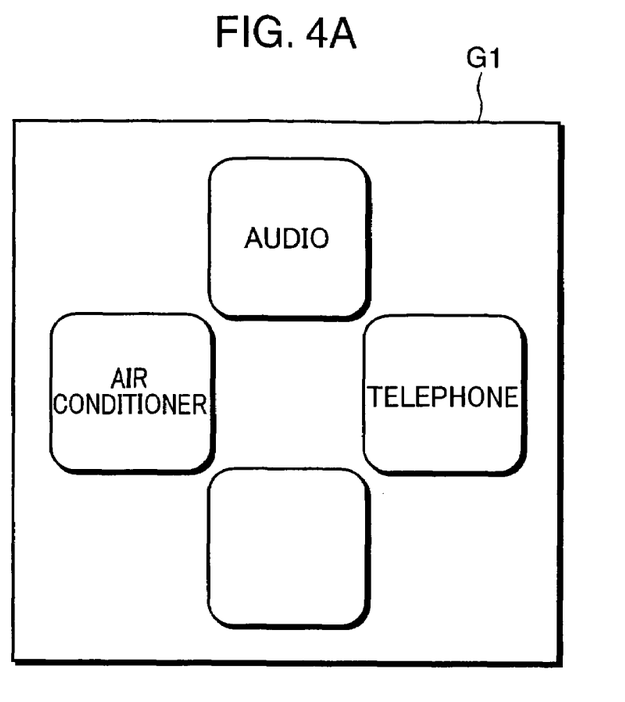
FIGS. 4A and 4B are diagrams, showing an example of the display operation according to an embodiment of the present invention.

Then, the display control section 8 displays, for example, as shown in FIG. 4A, an operation-instruction acceptance image G1 for selecting equipment to be operated out of the audio system 5, the air conditioner 6 and the telephone 7. It is displayed after the model of the array of the push switches 21, 22, 23, 24 stored in the storage section 4.

For example, if an operator tries to operate the audio system 5, the operator checks the operation-instruction acceptance image G1 displayed in the display 3. Then, among the push switches 21 to 24 shown in FIG. 2, the operator operates the push switch 22 which corresponds to the audio system 5. Thereby, a signal for recognizing that the push switch 22 has been pressed is sent to the control section 2a. At this time, the push switch 22 is pressed with the operation-instruction acceptance image G1 remaining displayed in the display 3. Hence, in the operation-instruction acceptance image G1, the control section 2a accepts an operation instruction to select "Audio" which is displayed in the position corresponding to the push switch 22. On the basis of the control-signal information stored in the storage section 4, the control section 2a generates an equipment control signal adapted for controlling the audio system 5 selected as the target of an operation. For example, it generates an equipment control signal for allowing the audio system 5 to output a sound and a voice. This signal is transmitted via the equipment communication section 9 to the audio system 5, so that the audio system 5 can be operated.

Furthermore, for example, if the audio system 5 has the functions of an FM radio, an AM radio, a CD player and a CD changer, operation-instruction information which indicates that the audio system 5 can accept an operation instruction to select "FM radio", "AM radio", "CD player" and "CD changer" is stored in the storage section 4. In this case, for example, as shown in FIG. 5A, based on the operation-instruction information of the audio system 5, the display control section 8 displays an operation-instruction acceptance image G2 for selecting any of "FM" (i.e., the FM radio), "AM" (i.e., the AM radio), "CD" (i.e., the CD player) and "CD changer" (i.e., the CD changer)". It is displayed on the model of the array of the push switches 21, 22, 23, 24 stored in the storage section 4.

Moreover, for example, if the operator wants to use the AM-radio function of the audio system 5, then on the operation-instruction acceptance image G2 displayed in the display 3, the operator confirms that the push switch corresponding to "AM" is the push switch 21. If the push switch 21 is pressed, the control section 2a accepts an operation instruction to select the AM-radio function. On the basis of the control-signal information stored in the storage section 4, the control section 2a generates a control signal for setting the AM-radio function in the audio system 5. This control signal is transmitted via the equipment communication section 9 to the audio system 5, so that the AM radio can be operated. In terms of the air conditioner 6 or the telephone 7, in the same way, if its corresponding push switch is pressed down, the selection of equipment and the selection of a function can be made.

Next, an operation of the vehicle input system 100a in the case where equipment connected to the communication line 91 is replaced will be described using FIG. 10. Herein, in the following flow charts, the same processing is given its identical step numeral, and thus, its description is omitted. First, in a step S51, let's assume that the audio system 5 is exchanged for a new type, for example, a CD-changer function is deleted and a hard-disk audio function is added. In this case, operation-instruction information and control-signal information on the substituted equipment and function are not stored in the storage section 4 inside of the control section 2a.

Herein, for example, the push switch 25 (i.e., an equipment-exchange instruction button) is pressed down, or a storage medium is detected being inserted into the storage-medium reading unit 10. Thereby, the control section 2a is designed to accept an equipment-exchange instruction to exchange equipment connected to the communication line 91. Then, the control section 2a confirms whether the equipment-exchange instruction should be accepted or not (in a step S52). If the equipment-exchange instruction is accepted, then in order to execute an equipment-exchange processing, it shifts the processing to a step S53 (YES at the step S52). On the other hand, if the equipment-exchange instruction is not accepted, the decision is made that equipment connected to the communication line 91 is not replaced. Without executing the equipment-exchange processing, the processing is terminated (NO at the step S52).

At this time, unless the control section 2a does not accept the equipment-exchange instruction (NO at the step S52), the operation-instruction information and the control-signal information on the new substituted audio system 5 are not stored in the storage section 4. Therefore, as shown in a step S57, for example, even if the operation-instruction acceptance image G1 shown in FIG. 4A is displayed in the display 3 and the push switch 22 corresponding to "Audio" is pressed down, then the control signal generated by the control section 2a is the one which corresponds to the audio system 5 before exchanged. Thus, it is not suitable for the fresh audio system 5, so that the operation of the fresh audio system 5 cannot be controlled.

In addition, even when a function is chosen, the operation-instruction acceptance image G2 corresponding to the audio system 5 before exchanged is displayed in the display 3. Hence, an operation-instruction acceptance image which corresponds to the new audio system 5 cannot be displayed in the display 3.

Therefore, in the step S52, for example, the operator inserts, into the storage-medium reading unit 10, a storage medium in which the control-signal information and the operation-instruction information on the new audio system 5 are stored. For example, the operator presses the push switch 25, or the operator is detected inserting the storage medium into the storage-medium reading unit 10. Thereby, if the control section 2a accepts the equipment-exchange instruction (YES at the step S52), the storage-medium reading unit 10 reads the control-signal information and the operation-instruction information which are stored in the storage medium (in a step S53). Then, they are stored in the storage section 4 (in a step S54).

Thereby, the control-signal information and the operation-instruction information stored in the storage section 4 are updated into the information which corresponds to the new audio system 5 (in a step S55). As shown in a step S56, if the operator wants to operate the audio system 5, the audio system is chosen by pressing the push switch 22 of the input unit 1. According to the new control-signal information stored in the storage section 4, the control section 2a generates a control signal which corresponds to the new audio system 5. This control signal is transmitted via the equipment communication section 9 to the new audio system 5, so that the new audio system 5 can be operated. Besides, according to the operation-instruction information on the new audio system 5, for example, an operation-instruction acceptance image G3 shown in FIG. 5B is displayed in the display 3. This makes it possible to choose a hard-disk audio "HDD" which is a fresh function.

In addition, for example, as shown in FIG. 6, if a car-navigation system 30 is additionally connected as new equipment to the communication line 91, operation-instruction information and control-signal information on the car-navigation system 30 are not stored in the storage section 4 inside of the control section 2. Hence, the car-navigation system 30 is not displayed on the display screen of the display 3. Specifically, the operation-instruction acceptance image G1 shown in FIG. 4A is displayed thereon, so that a user cannot choose the car-navigation system 30. Besides, the control section 2 cannot generate a control signal which corresponds to the car-navigation system 30. This makes it impossible to control the operation of the car-navigation system 30.

Figure 4B:
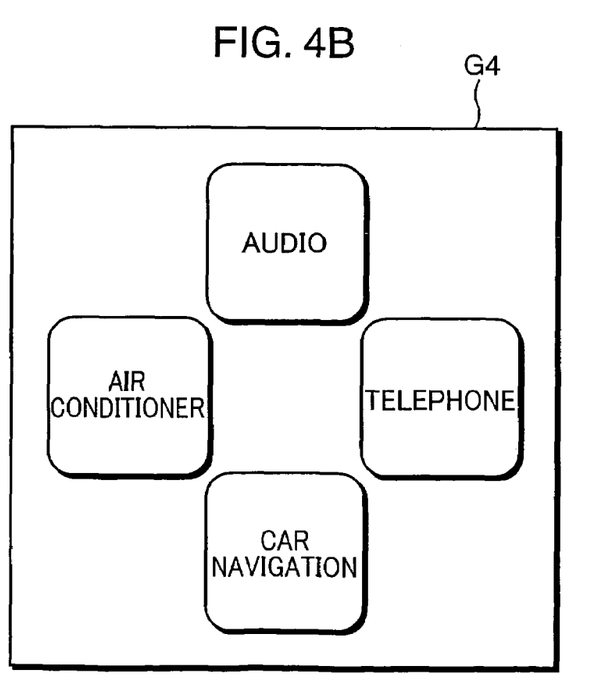

Therefore, if equipment is additionally connected to the communication line 91, then in the same way as the above described equipment-replacement case, the processing of the steps S52 to S55 shown in FIG. 10 is executed. In this processing, the storage-medium reading unit 10 reads operation-instruction information and control-signal information on the car-navigation system 30 from a storage medium. Then, they are stored in the storage section 4. Thereby, the information stored in the storage section 4 is renewed, and as shown in FIG. 4B, the display control section 8 can display, in the display 3, an operation-instruction acceptance image G4 which freshly includes a display "Car-navigation" for selecting the car-navigation system 30. Then, if the operator wants to operate the car-navigation system 30, the operator presses the push switch 24 in the position corresponding to "Car-navigation" on the operation-instruction acceptance image G4. As a result, the car-navigation system 30 can be chosen.

In addition, for example, in a step S61 shown in FIG. 11, if equipment connected to the communication line 91, for example, the audio system 5, is removed, then for example, the operator presses down a push switch 26 (i.e., an equipment-deletion instruction button). Thereby, the control section 2a detects the push switch 26 being pressed and accepts an equipment-deletion instruction (YES at a step S62). For example, the equipment communication section 9 communicates with all the pieces of equipment whose control-signal information is stored in the storage section 4, for example, the audio system 5, the air conditioner 6 and the telephone 7. Then, equipment from which no communication response is made, for example, the audio system 5, is detected as the removed equipment (in a step S63). In this case, the equipment communication section 9 corresponds to an example of a detection section.

Then, the control-signal information and the operation-instruction information on the audio system 5 detected as the removed equipment by the equipment communication section 9 is deleted from the storage section 4 by the control section 2a (in a step S64). Thereby, the display control section 8 is prevented from displaying, in the display 3, an image for equipment which is not connected to the communication line 91. Consequently, it can display, in the display 3, an image according to a change in the situation of the equipment connected to the communication line 91 which is caused by eliminating the audio system 5.

Incidentally, in order to detect substituted equipment or removed equipment, for example, such a processing as described below may also be executed. If the power is turned on (i.e., an ignition key is turned on), if the operator is detected pressing the push switch 25, or at regular intervals, then the control section 2a transmits, to each piece of equipment, a (common) signal SA for checking that they are still in place. Upon receiving this signal, each piece of equipment transmits a signal SB specific to their respective pieces of equipment to the control section 2a which has transmitted the signal SA. Then, the control section 2a collates the equipment identified by this signal SB with the storage contents of the storage section 4. If it is different from the equipment stored in the storage section 4, the processing is executed of the step S53 and its subsequent steps shown in FIG. 10. Or, if the signal SB which represents equipment stored in the storage section 4 is not received, the decision is made that this equipment has been removed. Then, the processing is executed of the step S63 and its subsequent steps shown in FIG. 11.

Furthermore, as shown in FIG. 7, in the vehicle input system 100 shown in FIG. 1, for example, a storage changing section 11 which has the function of communicating with the equipment communication section 9 may also be connected to the communication line 91. In this case, operation-instruction information and control-signal information on substituted or added equipment are transmitted from the storage changing section 11 through the communication line 91 to the equipment communication section 9. Then, the operation-instruction information and the control-signal information received by the equipment communication section 9 are stored in the storage section 4. Besides, information which represents equipment separated from the communication line 91, or eliminated equipment, may also be transmitted from the storage changing section 11 through the communication line 91 to the equipment communication section 9. Then, operation-instruction information and control-signal information on the equipment which is indicated by the information received by the equipment communication section 9 are deleted from the storage section 4. As the storage changing section 11, various terminal devices with a wire-communication function can be used, such as a personal computer and a notebook personal computer. In this case, the equipment communication section 9 corresponds to an example of an information acquisition section.

Moreover, like a vehicle input system 100c shown in FIG. 8, using a control section 2b provided with a radio reception section 12 which communicates by radio with a storage changing section 13, operation-instruction information and control-signal information on substituted or added equipment may also be transmitted by radio from the storage changing section 13 to the radio reception section 12. Then, the operation-instruction information and the control-signal information received by the radio reception section 12 are stored in the storage section 4. Besides, information which represents eliminated equipment may also be transmitted by radio from the storage changing section 13 to the radio reception section 12. Then, operation-instruction information and control-signal information on the equipment which is indicated by the information received by the radio reception section 12 are deleted from the storage section 4. As the storage changing section 13, various terminal devices with a radio-communication function can be used, such as a personal computer and a notebook personal computer. In this case, the radio reception section 12 corresponds to an example of an information acquisition section.

In addition, as shown in FIG. 9, in the vehicle input system 100 shown in FIG. 1, for example, equipment such as the audio system 5, the air conditioner 6, the telephone 7 and a car-navigation system 40 which are connected to the communication line 91 may also include an equipment-information storage section 41 which stores operation-instruction information and control-signal information on this equipment. In this case, each piece of equipment transmits the operation-instruction information and the control-signal information stored in the equipment-information storage section 41, through the communication line 91 to the equipment communication section 9. Then, the operation-instruction information and the control-signal information received by the equipment communication section 9 are stored in the storage section 4. In this case, the equipment communication section 9 corresponds to an example of the information acquisition section. Incidentally, in FIG. 9, the description of an equipment-information storage section is omitted which is provided in each of the audio system 5, the air conditioner 6 and the telephone 7.

Furthermore, in the operation-instruction acceptance images G1, G2, G3, G4, a display image which indicates the contents of an operation instruction is displayed upon the model of the array of the push switches 21, 22, 23, 24. However, the display 3 may not be provided, as long as the operator can operate the input unit 1.

Moreover, the display 3 and a plurality of pieces of equipment such as an audio system are connected to the control section 2, through separate signal lines. However, they may also be connected via a common signal line.

In addition, the input unit 1, the control section 2, the display 3 and the plurality of pieces of equipment 5 to 7, 30, 40 are described as separate component elements. However, so long as their functions are satisfied, some or all of them may also be integrated into a single unit.

As described so far, the vehicle input system according to the present invention, comprising: an input unit which accepts an operation instruction for a plurality of pieces of equipment on board an automobile; and a control section which, in accordance with an operation instruction accepted by the input unit, transmits a control signal for controlling the equipment targeted by the operation instruction, wherein if at least one of the plurality of pieces of equipment is exchanged or removed, or if new equipment is added, the control section changes the control signal in accordance with the exchange, removal and addition of the equipment.

According to this configuration, if at least one of a plurality of pieces of equipment on board an automobile is exchanged or removed, or if new equipment is added, then the composition of a control signal is changed which is transmitted to equipment from the control section. Thereby, the control signal can be changed so that it will be adapted to a change in the situation caused by the exchange, removal or addition of the equipment. This makes it possible to operate equipment without changing the input unit and the control section, even if equipment is replaced, removed or added.

Furthermore, it is preferable that: an information acquisition section be further provided which, if at least one of the plurality of pieces of equipment is exchanged or if new equipment is added, then acquires, as control-signal information, information on a control signal for controlling the substituted or added equipment; and the control section generate the control signal in accordance with the control-signal information acquired by the information acquisition section.

According to this configuration, if at least one of the plurality of pieces of equipment is exchanged, or if new equipment is added, then the information acquisition section acquires, as control-signal information, information on a control signal for controlling the substituted or added equipment. In accordance with the control-signal information acquired by the information acquisition section, the control section generates the control signal for controlling this equipment. Therefore, the control section can generate the control signal adapted to the substituted or added equipment. This makes it possible to operate equipment without changing the input unit and the control section, even if this equipment is substituted or added.

Moreover, preferably: a storage section should be further provided which stores, as the control-signal information, information on a control signal for controlling the plurality of pieces of equipment; the information acquisition section should store, in the storage section, as new control-signal information, the information on a control signal for controlling the substituted or added equipment; and the control section should generate the control signal in accordance with the control-signal information stored in the storage section.

According to this configuration, if at least one of the plurality of pieces of equipment is exchanged, or if new equipment is added, then the information on a control signal for controlling the substituted or added equipment which has acquired by the information acquisition section is stored as new control-signal information in the storage section. In accordance with the control-signal information stored in the storage section, the control section generates the control signal for controlling this equipment. Therefore, the control section can generate the control signal adapted to the substituted or added equipment. This makes it possible to operate equipment without changing the input unit and the control section, even if this equipment is substituted or added.

In addition, it is preferable that: a display which displays an image be further provided; the input unit include a plurality of push switches for accepting the operation instruction, the push switches being disposed in a predetermined array; if at least one of the plurality of pieces of equipment is exchanged or if new equipment is added, the information acquisition section further acquire, as operation-instruction information, information which indicates one or a plurality of operation instructions acceptable by the substituted or added equipment, and store the information in the storage section; and the control section display, in the display, the one or plurality of operation instructions indicated by the operation-instruction information stored in the storage section, on the model of the array of the plurality of push switches.

According to this configuration, the input unit is formed by disposing a plurality of push switches for accepting the operation instruction in a predetermined array. If at least one of the plurality of pieces of equipment is exchanged or if new equipment is added, then the information acquisition section further acquires, as operation-instruction information, information which indicates one or a plurality of operation instructions acceptable by the substituted or added equipment. Then, it stores this information in the storage section. Sequentially, the one or plurality of operation instructions indicated by the operation-instruction information stored in the storage section are displayed in the display, after the model of the array of the plurality of push switches. Therefore, a user can give operation instructions acceptable by the substituted or newly-added equipment, using the push switches arranged so as to correspond to these operation instructions which are displayed in the display.

Furthermore, preferably, the operation instruction should include at least an equipment-selection instruction for selecting equipment to be operated out of the plurality of pieces of equipment, and a function-selection instruction for selecting a function of the selected equipment.

According to this configuration, the operation instruction should include at least an equipment-selection instruction for selecting equipment to be operated out of the plurality of pieces of equipment, and a function-selection instruction for selecting a function of the selected equipment. Therefore, the user can operate the input unit while looking at the operation instruction displayed in the display. This makes it possible to choose equipment to be operated among the plurality of pieces of equipment, or select a function of the equipment.

Moreover, it is preferable that the information acquisition section be a reading unit for a storage medium, and read, from the storage medium, information on a control signal for controlling the substituted or added equipment.

According to this configuration, the information acquisition section can acquire, from the storage medium, information on a control signal for controlling the substituted or added equipment.

In addition, the information acquisition section may also be an equipment communication section which communicates via a communication line with a storage changing section provided outside, and receive, via the communication line from the storage changing section, the information on the control signal for controlling the substituted or added equipment.

According to this configuration, the information acquisition section can receive, via the communication line from the storage changing section, the information on the control signal for controlling the substituted or added equipment.

Furthermore: as the communication line, a signal line may also be used which connects at least one of the input unit, the plurality of pieces of equipment and the display to the control section.

According to this configuration, the information acquisition section uses, as the communication line, the signal line which connects at least one of the input unit, the plurality of pieces of equipment and the display to the control section. Thereby, it can receive the information on the control signal for controlling the substituted or added equipment from the storage changing section. Hence, there is no need to separately provide a communication line used for its communication with the storage changing section. This helps simplify the configuration.

Moreover, the information acquisition section may also be a radio reception section which communicates by radio with a storage changing section provided outside, and acquire, through radio communication from the storage changing section, the information on the control signal for controlling the substituted or added equipment.

According to this configuration, the information acquisition section can acquire the information on the control signal for controlling the substituted or added equipment, through radio communication from the storage changing section.

In addition, the information acquisition section may also be an equipment communication section which communicates via a communication line with the plurality of pieces of equipment, and receive the information on the control signal for controlling the substituted or added equipment via the communication line from the equipment.

According to this configuration, without using a storage medium or a unit which is separate from the substituted or added equipment, the information acquisition section can receive the information on the control signal for controlling the substituted or added equipment, via the communication line from the equipment. This makes it possible to improve the convenience.

Furthermore, it is preferable that the information acquisition section be a reading unit for a storage medium, and read the information which indicates one or a plurality of operation instructions acceptable by the substituted or added equipment from the storage medium.

According to this configuration, the information acquisition section can read, from the storage medium, the information which indicates one or a plurality of operation instructions acceptable by the substituted or added equipment.

Moreover, the information acquisition section may also be an equipment communication section which communicates via a communication line with a storage changing section provided outside, and receive, via the communication line from the storage changing section, the information which indicates one or a plurality of operation instructions acceptable by the substituted or added equipment.

According to this configuration, the information acquisition section can receive the information which indicates one or a plurality of operation instructions acceptable by the substituted or added equipment, via the communication line from the storage changing section connected to the outside.

In addition: as the communication line, a signal line may also be used which connects at least one of the input unit, the plurality of pieces of equipment and the display to the control section.

According to this configuration, the information acquisition section uses, as the communication line, a signal line which connects at least one of the input unit, the plurality of pieces of equipment and the display to the control section. Thereby, it can receive, from the storage changing section, the information which indicates one or a plurality of operation instructions acceptable by the substituted or added equipment. Hence, there is no need to separately provide a communication line used for its communication with the storage changing section. This helps simplify the configuration.

Furthermore, the information acquisition section may also be a radio reception section which communicates by radio with a storage changing section provided outside, and acquire, through radio communication from the storage changing section, the information which indicates one or a plurality of operation instructions acceptable by the substituted or added equipment.

According to this configuration, the information acquisition section can acquire the information which indicates one or a plurality of operation instructions acceptable by the substituted or added equipment, through radio communication from the external storage changing section.

Moreover, the information acquisition section may also be an equipment communication section which communicates via a communication line with the plurality of pieces of equipment, and receive the information which indicates one or a plurality of operation instructions acceptable by the substituted or added equipment via the communication line from the equipment.

According to this configuration, without using a storage medium or a unit which is separate from the substituted or added equipment, the information acquisition section can receive the information which indicates one or a plurality of operation instructions acceptable by this equipment, via the communication line from the equipment. This makes it possible to improve the convenience.

In addition, preferably, the above described vehicle input system should further comprise: a storage section which stores, as control-signal information, information on a control signal for controlling the plurality of pieces of equipment; and a detection section which, if at least one of the plurality of pieces of equipment is removed, detects the removed equipment, wherein if the removed equipment is detected by the detection section, the control section should delete the control-signal information on the removed equipment from the storage section and generate the control signal in accordance with the control-signal information stored in the storage section.

According to this configuration, if at least one of the plurality of pieces of equipment is removed, the detection section detects the removed equipment. Then, control-signal information on the removed equipment is deleted from the storage section. Thereafter, the control signal is generated in accordance with the control-signal information stored in the storage section. Therefore, the control signal can be restrained from being transmitted in error to the equipment which has already been removed.

This application is based on Japanese patent application Ser. No. 2005-146242, filed in Japan Patent Office on May 19, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle input system, comprising:
   an input unit which accepts an operation instruction for a plurality of pieces of equipment on board an automobile; and
   a control section which, in accordance with an operation instruction accepted by the input unit, transmits a control signal for controlling the equipment targeted by the operation instruction,
   wherein if at least one of the plurality of pieces of equipment is exchanged or removed, or if new equipment is added, the control section changes the control signal in accordance with the exchange, removal or addition of the equipment.

2. The vehicle input system according to claim 1, wherein:
an information acquisition section is further provided which, if at least one of the plurality of pieces of equipment is exchanged or if new equipment is added, then acquires, as control-signal information, information on a control signal for controlling the substituted or added equipment; and
the control section generates the control signal in accordance with the control-signal information acquired by the information acquisition section.

3. The vehicle input system according to claim 2, wherein:
a storage section is further provided which stores, as the control-signal information, information on a control signal for controlling the plurality of pieces of equipment;
the information acquisition section stores, in the storage section, as new control-signal information, the information on the control signal for controlling the substituted or added equipment; and
the control section generates the control signal in accordance with the control-signal information stored in the storage section.

4. The vehicle input system according to claim 3, wherein:
a display which displays an image is further provided;
the input unit includes a plurality of push switches for accepting the operation instruction, the push switches being disposed in a predetermined array;
if at least one of the plurality of pieces of equipment is exchanged or if new equipment is added, the information acquisition section further acquires, as operation-instruction information, information which indicates one or a plurality of operation instructions acceptable by the substituted or added equipment, and stores the operation-instruction information in the storage section; and
the control section displays, in the display, the one or plurality of operation instructions indicated by the operation-instruction information stored in the storage section, on the model of the array of the plurality of push switches.

5. The vehicle input system according to claim 1, wherein the operation instruction includes at least an equipment-selection instruction for selecting equipment to be operated out of the plurality of pieces of equipment, and a function-selection instruction for selecting a function of the selected equipment.

6. The vehicle input system according to claim 3, wherein the information acquisition section is a reading unit for a storage medium, and reads the information on the control signal for controlling the substituted or added equipment from the storage medium.

7. The vehicle input system according to claim 3, wherein the information acquisition section is an equipment communication section which communicates via a communication line with a storage changing section provided outside, and receives, via the communication line from the storage changing section, the information on the control signal for controlling the substituted or added equipment.

8. The vehicle input system according to claim 7, wherein:
as the communication line, a signal line is used which connects at least one of the input unit, the plurality of pieces of equipment and the display to the control section.

9. The vehicle input system according to claim 3, wherein the information acquisition section is a radio reception section which communicates by radio with a storage changing section provided outside, and acquires, through radio communication from the storage changing section, the information on the control signal for controlling the substituted or added equipment.

10. The vehicle input system according to claim 3, wherein the information acquisition section is an equipment communication section which communicates via a communication line with the plurality of pieces of equipment, and receives the information on the control signal for controlling the substituted or added equipment via the communication line from the equipment.

11. The vehicle input system according to claim 4, wherein the information acquisition section is a reading unit for a storage medium, and reads the information which indicates one or a plurality of operation instructions acceptable by the substituted or added equipment from the storage medium.

12. The vehicle input system according to claim 4, wherein the information acquisition section is an equipment communication section which communicates via a communication line with a storage changing section provided outside, and receives, via the communication line from the storage changing section, the information which indicates one or a plurality of operation instructions acceptable by the substituted or added equipment.

13. The vehicle input system according to claim 12, wherein: as the communication line, a signal line is used which connects at least one of the input unit, the plurality of pieces of equipment and the display to the control section.

14. The vehicle input system according to claim 4, wherein the information acquisition section is a radio reception section which communicates by radio with a storage changing section provided outside, and acquires, through radio communication from the storage changing section, the information which indicates one or a plurality of operation instructions acceptable by the substituted or added equipment.

15. The vehicle input system according to claim 4, wherein the information acquisition section is an equipment communication section which communicates via a communication line with the plurality of pieces of equipment, and receives the information which indicates one or a plurality of operation instructions acceptable by the substituted or added equipment via the communication line from the equipment.

16. The vehicle input system according to claim 1, further comprising:
a storage section which stores, as control-signal information, information on a control signal for controlling the plurality of pieces of equipment; and
a detection section which, if at least one of the plurality of pieces of equipment is removed, detects the removed equipment,
wherein if the removed equipment is detected by the detection section, the control section deletes the control-signal information on the removed equipment from the storage section and generates the control signal in accordance with the control-signal information stored in the storage section.

* * * * *